(No Model.)
S. E. DAVIS.
ROLLER.
No. 408,338. Patented Aug. 6, 1889.
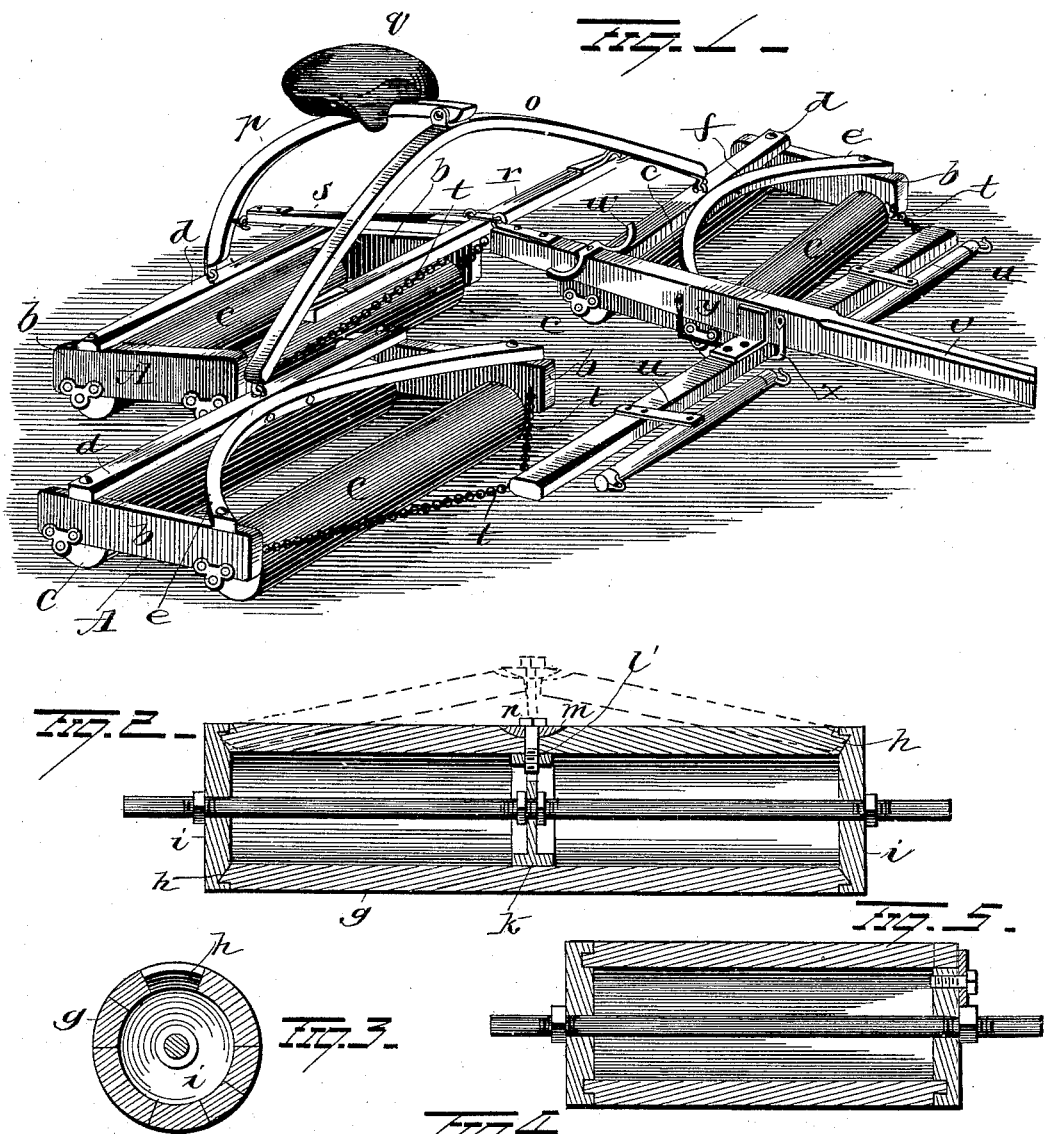
Witnesses
E. J. Nottingham
G. F. Downing
Inventor
Spencer E. Davis.
By his Attorney
H. A. Seymour

UNITED STATES PATENT OFFICE.

SPENCER E. DAVIS, OF HORICON, WISCONSIN, ASSIGNOR TO THE VAN BRUNT & DAVIS COMPANY, OF SAME PLACE.

ROLLER.

SPECIFICATION forming part of Letters Patent No. 408,338, dated August 6, 1889.

Application filed February 15, 1889. Serial No. 300,038. (No model.)

*To all whom it may concern:*

Be it known that I, SPENCER E. DAVIS, a resident of Horicon, in the county of Dodge and State of Wisconsin, have invented certain new and useful Improvements in Rollers; and I do hereby declare the following to be a full, clear, and exact description of the invention, such as will enable others skilled in the art to which it appertains to make and use the same.

My invention relates to an improvement in rollers. There has been a demand for a roller that is practical in operation and reasonable in cost, and one combining with these qualities lightness, durability, strength, and effectiveness in operation.

It is the object of my present invention to supply these demands, and, furthermore, to provide a roller which may be shipped in small compass, be easily put together, and made heavier by filling the rollers to suit the hardness of the soil to be rolled. A further object is to provide means for applying the draft directly to the roller-sections and applying the whole weight of the driver to the rear of said sections.

With these ends in view the invention consists in certain novel features of construction and combinations of parts, as will be hereinafter described, and pointed out in the claims.

In the accompanying drawings, Figure 1 is a view in perspective of my improved roller. Fig. 2 is a view in longitudinal section of one of the rollers removed from the frame. Fig. 3 is a cross-sectional view of the same. Fig. 4 is a detached view of the sectional stave, and Fig. 5 is a modification.

A A represent the roller-sections. These are preferably three in number, and arranged, as shown, with two in front and one behind. The front sections are located a distance apart somewhat less than the width of the sections, so that the rollers in the rear section traverse the ground left between the rollers of the front sections. As the roller-sections are alike and the rollers also are all of the same construction, it will only be necessary to describe one. The sections A consist of the end bars $b$, which are held apart rigidly by the cross-pieces $d$ and the braces $e$, the latter being secured to the cross-pieces at the middle $f$, and the whole frame, consisting of the bar and braces, is supported on the ends of a pair of rollers $c$.

Rollers $c$ are hollow, and while they may for the most part be made in one piece, yet I prefer to form them as shown, wherein the rollers are formed of a series of staves $g$, reaching at the ends in grooves $h$ in the heads $i$, where they are held securely in any approved manner. Hoops may be driven onto the ends of these staves in order to hold them rigidly in place against the heads, or other similar means may be adapted, it only being essential that the staves should be held in place. In the center of the roller a strengthening-rib $k$ is located, it being adapted to support the staves at the center.

An essential feature of my invention consists in making one of these staves removable. This may be readily accomplished in several different ways, two of which I propose now to describe, and first by forming one of the staves in sections by cutting it in the middle, or, to be more exact, by first boring a hole $l$ in the center, countersinking this hole to receive a washer $m$ sufficiently large to considerably overlap the hole, and then cutting the stave through this hole. This hole, it will be observed, when the stave is in position, rests directly over the hole $l'$ in the rib $k$, and now, to secure this sectional stave in position like the rest, the bolt $n$, extending through the washer, the hole $l$ in the stave, and the hole $l'$ in the rib, is screwed up tight, thereby forcing the outer ends tight up into the grooves $h$ and the adjacent ends down upon the rib $k$. The other means consists in inserting a full-length stave in the groove of one head and securing the other end by a bolt, as shown in Fig. 5. The object of furnishing this removable stave is to provide an opening through which the rollers may be filled. It is neither desirable nor necessary for the purchaser to pay freight on a lot of filling that he may as well supply himself right from his own farm, and hence the provision above described is made. To fill a roller, the bolt is unscrewed and stone, sand, and cement, gravel, or earth are put in, and the stave is put back and made fast, so that but little time or care is necessary.

Of course more roller-sections might be employed; but the three, as I generally prefer to arrange them, are placed as shown and described.

The arched support $o$ extends across from one roller-section to the other and its ends are loosely connected or pivoted to the cross-pieces $d$ at or near the center. Another arched support $p$ extends from the center of the cross-piece $d$ of the rear section up to the center of support $o$, where it is secured, and on this support $p$ the seat $q$ is fixed. A brace $r$ prevents the ends of arched support $o$ from spreading, it being located a little above the ends of the latter, and a similar brace $s$ extends from the center of brace $r$ to arched support $p$ and performs a similar function as the other brace. Thus it is seen not only that the seat has a yielding and also substantial support, but also that nearly the entire weight of the driver may be put upon the rear portion and rear rollers of each section, so that the front rollers, while they crumble and pack the earth and hard lumps to quite an extent, yet the greater amount of this is done by the rear rollers, the front ones preparing the way, as it were, for the others. These roller-sections, besides having a pivoted or loose connection with the seat-supporting frame, also are connected by chains or similar devices $t$ to other parts. Said chains extend from the front ends of the bars $b$ in one case (that is, the rear section) to the center of brace $r$, and in the other case (the front sections) to the ends of the whiffletree $u$.

The pole $v$ is flexible and is hooked to the brace $r$ and provided with the foot-rest $w$. The whiffletrees are supported by the pole, they preferably extending through an elongated slot, or else they are held on hangers $x$, the plates $y$ preventing them from sliding lengthwise, so that the draft is not applied through the pole at all, but immediately upon the front sections. The parts may be hooked together or otherwise removably connected, so that the roller may be readily taken apart to render transportation easy.

It is evident that slight changes might be resorted to in the form and arrangement of the several parts described without departing from the spirit and scope of my invention; hence I do not wish to limit myself to the particular construction herein set forth; but, Having fully described my invention, what I claim as new, and desire to secure by Letters Patent, is—

1. The combination, with a series of independent roller-sections, each consisting of a frame and roller mounted therein, and a seat-supporting frame connecting said sections, of draft attachments connected directly with the several sections, substantially as set forth.

2. The combination, with a series of independent roller-sections, each section consisting of a frame and rollers mounted therein, and a seat-carrying frame supported alike on all of said sections, of draft attachments connected directly to the several sections.

3. The combination, with a series of independent roller-sections, each section consisting of a frame and rollers mounted therein, of a seat-carrying frame pivotally connected to the several sections, and draft attachments connected directly to the several sections.

4. The combination, with roller-sections, each section consisting of a frame and rollers mounted therein, arched supports resting on the sections, braces on the supports, and a seat, of means for applying draft directly to the roller-sections, substantially as set forth.

5. The combination, with roller-sections and seat-frame, of a pole, and a whiffletree loosely supported by the pole and connected loosely to the forward roller-sections, substantially as set forth.

6. The combination, with the roller-sections, arched supports resting on said sections, braces connecting the supports, and chains or similar devices connecting the forward end of the rear section with one of said braces, of a pole hooked to this brace, said pole having a slot, hangers or loops thereon, a whiffletree extending through the latter, and chains or similar devices connecting the forward ends of the front sections with the ends of the whiffletree, substantially as set forth.

7. A hollow roller having a removable portion, the latter being made in sections, and means adapted to pass between the adjacent ends of the sections, whereby the removable portion is held in place, substantially as set forth.

8. In a roller, the combination, with the heads, staves, and center-brace, of a removable sectional stave and a screw or similar device adapted to pass between the adjacent ends of the sectional removable stave and into the brace, whereby the sections of this stave are forced outward and against the brace and held in place, substantially as set forth.

In testimony whereof I have signed this specification in the presence of two subscribing witnesses.

SPENCER E. DAVIS.

Witnesses:
C. L. BUTTERFIELD,
J. H. PETHERBRIDGE.